United States Patent
Glossner et al.

(10) Patent No.: US 7,475,222 B2
(45) Date of Patent: Jan. 6, 2009

(54) MULTI-THREADED PROCESSOR HAVING COMPOUND INSTRUCTION AND OPERATION FORMATS

(75) Inventors: C. John Glossner, Carmel, NY (US); Erdem Hokenek, Yorktown Heights, NY (US); Mayan Moudgill, White Plains, NY (US); Michael J. Schulte, Madison, WI (US)

(73) Assignee: Sandbridge Technologies, Inc., White Plains, NY (US)

( * ) Notice: Subject to any disclaimer, the term of this patent is extended or adjusted under 35 U.S.C. 154(b) by 0 days.

(21) Appl. No.: 11/096,767

(22) Filed: Apr. 1, 2005
(Under 37 CFR 1.47)

(65) Prior Publication Data

US 2006/0095717 A1 May 4, 2006

Related U.S. Application Data

(60) Provisional application No. 60/560,200, filed on Apr. 7, 2004.

(51) Int. Cl.
G06F 15/16 (2006.01)
(52) U.S. Cl. ............................................ 712/7; 712/24
(58) Field of Classification Search ................... 712/24, 712/2–9, 221–222
See application file for complete search history.

(56) References Cited

U.S. PATENT DOCUMENTS

| | | | |
|---|---|---|---|
| 6,115,806 A | 9/2000 | Yoshida | |
| 6,557,094 B2 | 4/2003 | Pechanek et al. | |
| 6,842,848 B2 | 1/2005 | Hokenek et al. | |
| 2002/0120830 A1* | 8/2002 | Matsuo | 712/209 |
| 2003/0120901 A1 | 6/2003 | Hokenek et al. | |
| 2003/0191789 A1* | 10/2003 | Sheaffer | 708/670 |
| 2004/0073772 A1 | 4/2004 | Hokenek et al. | |
| 2004/0073779 A1 | 4/2004 | Hokenek et al. | |

OTHER PUBLICATIONS

ChipSoft, photocopy of "TurboTax" diskettes, v11.01, Tax Year 1993, 1994.*

J.A. Fisher, "Very Long Instruction Word Architectures and the ELI-512," ACM, pp. 263-273, Jun. 1983.

R.P. Colwell et al., "A VLIW Architecture for a Trace Scheduling Compiler," IEEE Transactions on Computers, pp. 967-979, Aug. 1988.

N. Seshan, "High VelociTI Processing: Texas Instruments VLIW DSP Architecture," IEEE Signal Processing Magazine, vol. 15, No. 2, pp. 86-101 and 117, Mar. 1998.

M. Smotherman, "Understanding EPIC Architectures and Implementations," ACM Southeast Conference, 8 pages, 2002.

(Continued)

*Primary Examiner*—Richard Ellis
(74) *Attorney, Agent, or Firm*—Lowenstein Sandler PC (57) ABSTRACT

A processor comprises a memory, an instruction decoder coupled to the memory for decoding instructions retrieved therefrom, and a plurality of execution units for executing the decoded instructions. One or more of the instructions are in a compound instruction format in which a single instruction comprises multiple operation fields, with one or more of the operation fields each comprising at least an operation code field and a function field. The operation code field and the function field together specify a particular operation to be performed by one or more of the execution units.

12 Claims, 4 Drawing Sheets

OTHER PUBLICATIONS

M. Schlansker et al., "EPIC: Explicitly Parallel Instruction Computing," IEEE Computer, pp. 37-45, Feb. 2000.
H. Sharangpani et al., "Itanium Processor Microarchitecture," IEEE Micro, pp. 24-43, Sep.-Oct. 2000.
PCT/US05/11613 International Search Report, May 14, 2007.
Chipsoft, TurboTax, photocopy of 3.5 inch diskettes, 1994.
Supplementary European Search Report, dated May 28, 2008.

* cited by examiner

| d | OPERATION 1 | OPERATION 2 | OPERATION 3 |
|---|---|---|---|
| 63 | 62                    42 | 41                 21 | 20                 0 |

FIG. 2B

| | | | | |
|---|---|---|---|---|
| Jump 20 16 | c 15 | cfa 14 12 | Imm8 11 4 | function 3 0 |
| Jump 20 16 | | Imm12 15 4 | | function 3 0 |
| Const 20 16 | | Imm12 15 4 | | function 3 0 |
| Integer 20 16 | rt 15 12 | ra 11 8 | rb 7 4 | function 3 0 |
| Integer 20 16 | rt 15 12 | ra 11 8 | Imm4 7 4 | function 3 0 |
| Integer 20 16 | c 15 | cft 14 12 | ra 11 8 | rb 7 4 | function 3 0 |
| Load 20 16 | rt 15 12 | ra 11 8 | rb 7 4 | function 3 0 |
| Load 20 16 | rt 15 12 | ra 11 8 | Imm4 7 4 | function 3 0 |
| Load 20 16 | vt 15 13 | / 12 | ra 11 8 | rb 7 4 | function 3 0 |
| Load 20 16 | vt 15 13 | / 12 | ra 11 8 | Imm4 7 4 | function 3 0 |
| Store 20 16 | rs 15 12 | ra 11 8 | Imm4 7 4 | function 3 0 |
| Store 20 16 | vs 15 13 | / 12 | ra 11 8 | Imm4 7 4 | function 3 0 |
| ctsr 20 16 | rt 15 12 | srt1 11 8 | srt2 7 4 | function 3 0 |
| cfsr 20 16 | rs 15 12 | srt1 11 8 | srt2 7 4 | function 3 0 |
| SIMD 20 16 | wt 15 13 | va 12 10 | vb 9 7 | wa 6 4 | function 3 0 |
| SIMD 20 16 | wt 15 13 | wa 12 10 | wb 9 7 | / 6 4 | function 3 0 |
| SIMD 20 16 | vt 15 13 | wa 12 10 | / 9 7 | / 6 4 | function 3 0 |

FIG. 3

```
L0:   lvu %vr0, %r3, 8

||    vmulreds %ac0,%vr0,%vr0,%ac0

||    loop %lc0,L0
```

FIG. 4

MULTI-THREADED PROCESSOR HAVING COMPOUND INSTRUCTION AND OPERATION FORMATS

RELATED APPLICATION(S)

The present application claims the priority of U.S. Provisional Application Ser. No. 60/560,200, filed Apr. 7, 2004 and entitled "Compound Instruction and Operation Formats for Low-Power Embedded Processors," which is incorporated by reference herein.

FIELD OF THE INVENTION

The present invention relates generally to the field of digital data processors, and more particularly to instruction sets for use in such processors.

BACKGROUND OF THE INVENTION

Programmable digital data processors use instructions, which are stored in memory, to tell the processor how to perform a specific task. Instructions typically include an operation code (opcode), which tells the processor what operation to perform, and operand specifiers, which indicate the location of input and output data used by the operation. The instructions to be performed by the processor are often stored in program memory and the data to be used by the instructions is often stored in data memory. Typical operations include loading data from memory, storing data to memory, performing arithmetic and logic operations, and branching to a different location in a program.

The amount of program memory used to implement a specific task or set of tasks is referred to as the code size. The code size depends on the size of the individual instructions, the complexity of the instructions, the complexity of the task or set of tasks, and other factors. In modern processors, instructions typically have a fixed size, since this allows the instructions to be efficiently fetched from memory, decoded, and executed. Because of how memory systems are designed, the instruction size in bits is often restricted to be a whole number power of two (e.g., 16 bits, 32 bits or 64 bits).

Small code size is an important goal in the design of low-power embedded processors, such as digital signal processors, multimedia processors and graphics processors. Thus, these types of architectures often feature compact instructions that are fairly powerful. For example, in a traditional embedded processor architecture, a 16-bit multiply-accumulate instruction might be used to specify that the values in two registers, RC and RB, should be multiplied together, and added to the value in an accumulator register, RA, with the result being stored back to the accumulator register RA.

To achieve small code size, many processors implement Single Instruction Multiple Data (SIMD) processing techniques. With SIMD processing, a single instruction is used to perform the same operation on multiple data operands. SIMD processing is especially useful when performing the same operation on multiple vector or matrix elements.

All programmable processors use some type of instruction format. Conventional instruction formats are described in, for example, John L. Hennessy and David A. Patterson, "Computer Architecture: A Quantitative Approach," Third Edition, Morgan Kaufmann Publishers, Inc., San Francisco, Calif., 2003.

In order to achieve high performance, modern embedded processors for applications such as digital signal processing, multimedia and graphics often have Very Long Instruction Word (VLIW) architectures. Examples are described in J. A. Fischer, "Very Long Instruction Word Architectures and ELI-512," Proceedings of the Tenth Symposium on Computer Architecture, pp. 140-150, June 1983, R. Colwell et al., "A VLIW Architecture for a Trace Scheduling Compiler," IEEE Transactions on Computers, pp. 967-979, August 1988, and N. Seshan, "High VelociTI Processing: Texas Instruments VLIW DSP Architecture," IEEE Signal Processing Magazine, Vol. 15, No. 2, pp. 86-101, March 1998. With these architectures, a single VLIW specifies multiple operations that can execute in parallel. For example, a 256-bit VLIW might have eight operation fields, each of which is specified using 32 bits. Although VLIW architectures typically offer improved performance over architectures that perform only a single operation each cycle, they may have much larger code size, since operation fields that cannot be utilized in a given cycle are filled with no operation (NOP) instructions.

More recently, Explicitly Parallel Instruction Computing (EPIC) architectures have been proposed. See, e.g., M. Smotherman, "Understanding EPIC Architectures and Implementations," ACM Southeast Conference, 2002, and M. Schlansker and B. Rau, "EPIC: Explicitly Parallel Instruction Computing," IEEE Computer, pp. 37-45, February, 2000. These architectures often contain additional bits in the instruction, which indicate the operations in the instruction that can execute in parallel or if multiple instructions can execute in parallel. Although these architectures often have more compact code than VLIW processors, they add complexity to the processor hardware.

Accordingly, a need exists for an improved approach to achieving small code size, particularly in low-power embedded processors, which avoids the problems associated with the above-described VLIW and EPIC approaches.

SUMMARY OF THE INVENTION

The present invention in an illustrative embodiment provides a processor which processes instructions in a compound instruction format. More particularly, up to three compound operations may be specified using only 64 bits. The compound instruction format achieves a small code size, and is well suited for low-power, high-performance embedded processors, such as digital signal processors, multimedia processors and graphics processors.

In accordance with one aspect of the invention, a processor comprises a memory, an instruction decoder coupled to the memory for decoding instructions retrieved therefrom, and a plurality of execution units for executing the decoded instructions. One or more of the instructions are in a compound instruction format in which a single instruction comprises multiple operation fields, with one or more of the operation fields each comprising at least an operation code field and a function field. The operation code field and the function field together specify a particular operation to be performed by one or more of the execution units.

Example operation codes in the illustrative embodiment include jump, constant, integer, load, store, copy to special register, copy from special register, and single instruction multiple data. The operation code and function fields may have fixed sizes and locations within the operation fields, so as to facilitate decoding and execution.

In accordance with another aspect of the invention, a given one of the instructions in the compound instruction format may comprise, in addition to multiple operation fields, at least one additional field comprising a dependency field. The dependency field may comprise a single-bit field which indicates if compound operations designated in the multiple operation fields should be executed sequentially or in parallel.

In the illustrative embodiment, a given one of the instructions in the compound instruction format comprises a 64-bit instruction having three 21-bit operation fields and a one-bit dependency field, although other formats may be used.

As another example, a given one of the instructions in the compound instruction format may comprise a compound operation that is specified by two or more multiple operation fields of the instruction.

One or more of the operation fields of a given one of the instructions in the compound instruction format may be restricted in terms of the particular operations which can be designated thereby. For example, one or more of the operation fields of the given instruction may be restricted to single instruction multiple data operations.

The compound instruction format in the illustrative embodiment advantageously overcomes the problems associated with the above-noted conventional VLIW and EPIC approaches.

DETAILED DESCRIPTION OF THE INVENTION

The present invention will be described in the context of a number of exemplary processor configurations. It should be understood, however, that the invention does not require the particular arrangements shown, and can be implemented using other types of digital data processors and associated processing circuitry. The present invention is generally suitable for implementation in any processor that can benefit from small code size and high performance processing. Such processors include, by way of example, programmable digital signal processors, multimedia processors and graphics processors.

A given processor as described herein may be implemented in the form of one or more integrated circuits.

In the illustrative embodiment of the invention, a compound instruction format is provided which allows up to three powerful compound operations to be specified using only 64 bits. The compound instruction format is well suited for low-power, high-performance embedded processors, such as the above-noted digital signal processors, multimedia processors and graphics processors.

Figure 1:
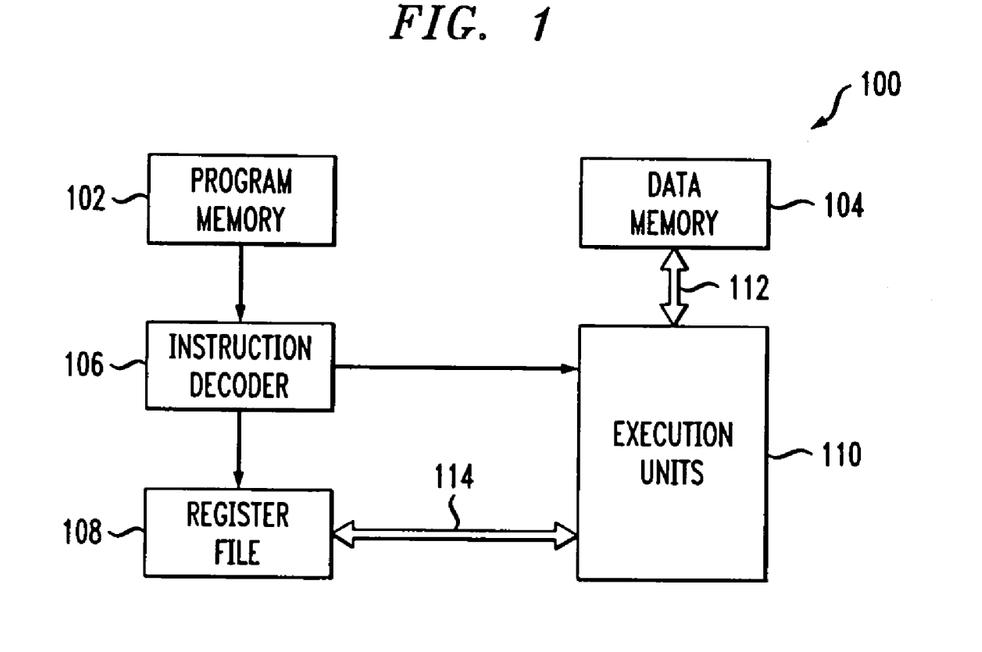
FIG. 1 is a simplified block diagram of an exemplary processor in which the present invention is implemented.

FIG. 1 shows a processor 100 in which instructions having the compound instruction format are processed. The processor 100 comprises program memory 102, data memory 104, an instruction decoder 106, a register file 108, and a plurality of execution units 110. The execution units 110 communicate with data memory 104 and register file 108 over respective bus lines 112 and 114.

Although shown as separate elements in the figure, program memory 102 and data memory 104 may comprise different portions of a single memory, or other memory arrangements. Also, at least a portion of one or both of the memories 102, 104 may be external to the processor 100 in alternative embodiments.

In general, the program memory 102 is used to store instructions to be executed by the processor 100, while the data memory 104 stores data that is operated on by the instructions. Instructions are fetched from the program memory 102 by the instruction decoder 106 which operates in conjunction with the register file 108 and the execution units 110 in controlling the execution of the instructions.

The processor 100 may comprise an embedded processor, for example, one that is embedded in application-specific integrated circuit associated with a mobile telephone, personal digital assistant or other portable computing device, or otherwise embedded within the device itself.

A more detailed example of a multithreaded version of processor 100 will be described below in conjunction with FIG. 4.

Figure 2A:
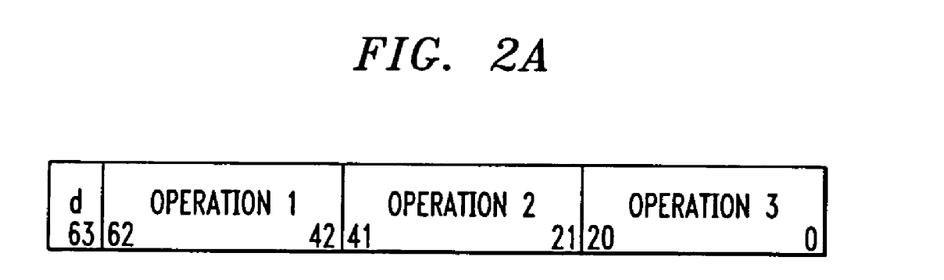
FIG. 2A shows an example of a compound instruction format for a 64-bit compound instruction in an illustrative embodiment of the invention.

FIG. 2A shows the compound instruction format utilized in processor 100 in the illustrative embodiment. The compound instruction format includes three 21-bit compound operation fields, denoted Operation 1, Operation 2 and Operation 3, and an optional 1-bit dependency field, d. In this example, the 64 bits of the compound instruction format are designated as bits 0 to 63, with the Operation 3 field comprising bits 0 to 20, the Operation 2 field comprising bits 21 to 41, the Operation 1 field comprising bits 42 to 62, and the dependency field d comprising bit 63.

The dependency field d indicates if the compound operations designated in the Operation 1, Operation 2 and Operation 3 fields should be executed sequentially or in parallel. For example, in one possible single-bit field implementation, if d is equal to one, then the compound operations contain dependencies and must be executed sequentially. If d is equal to zero, all three compound operations can execute in parallel. In other implementations, multiple bit dependency fields, with other types of logic indicators, may be used.

A wide variety of alternative formats are possible. For example, certain compound operations that require more than 21 bits may use two operation fields. It is also possible to vary the instruction length, operation field lengths, field locations, and other aspects of the format in order to accommodate the needs of a particular application. Thus, the instruction need not be 64 bits in length, but could be longer or shorter. Also, there could be more or fewer than three operation fields, and the various operation fields in a given instruction may have different lengths rather than all having the same length as in the FIG. 2A example.

The compound instruction format of FIG. 2A allows very powerful compound instructions to be specified using only 64 bits. This reduces code size and improves processor performance, which is important in low-power digital signal processing, multimedia and graphics processing applications.

The compound instruction format is also flexible and allows a wide variety of instructions to be specified. However, restrictions may be placed on the types of compound operations allowed in each operation field to reduce the design complexity of the processor. As one possible example, a particular implementation may restrict Operation 1 to be only Jump or Const operations, Operation 2 to be only Integer or Load/Store operations, and Operation 3 to be only SIMD operations.

Figure 2B:
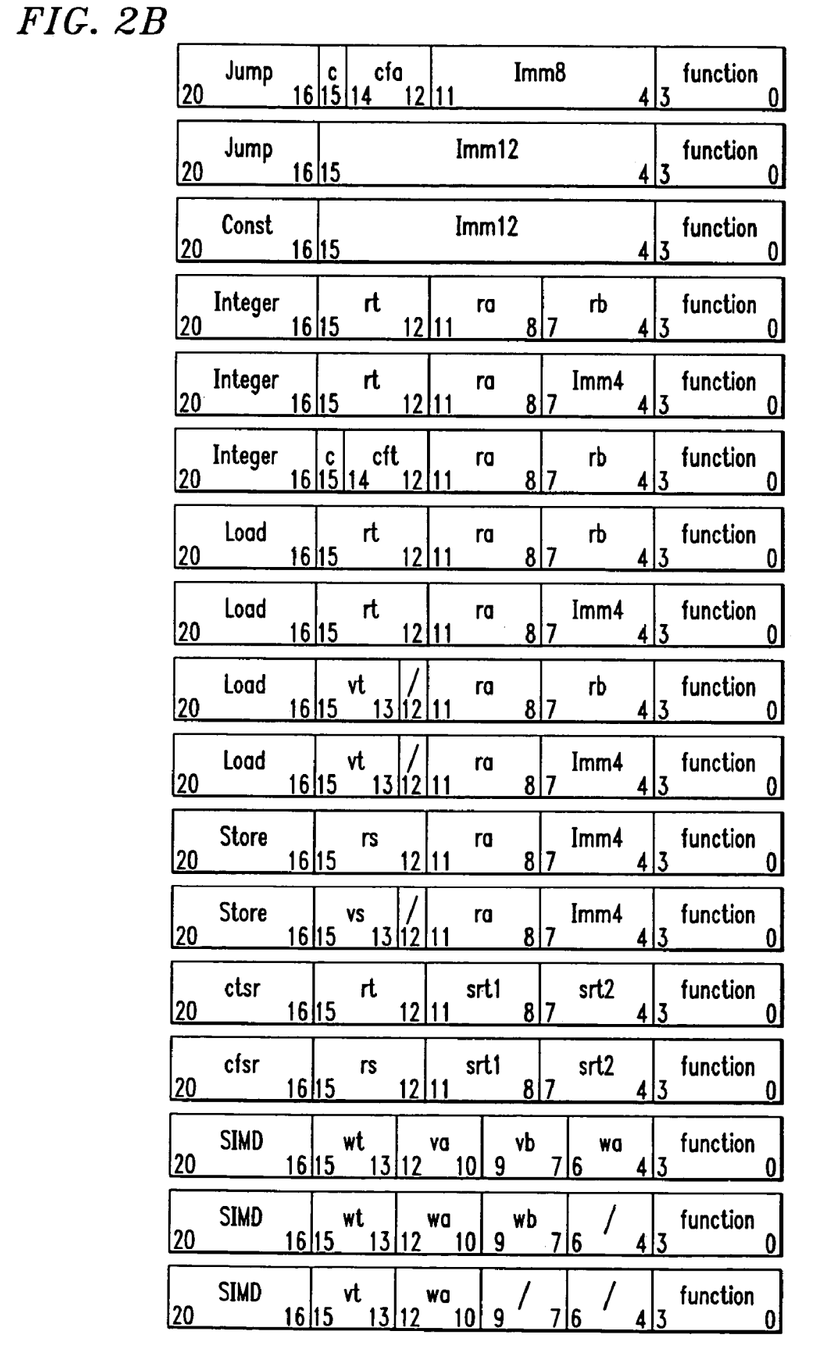
FIG. 2B illustrates a number of different examples of operation formats for 21-bit compound operations in the FIG. 2A instruction format in the illustrative embodiment of the invention.

FIG. 2B shows several potential formats for compound operations. Each compound operation field is 21 bits, but the format for these operations may differ based on the type of operation.

The leftmost field in these examples is always five bits and corresponds to the opcode, which specifies the type of operation to be performed (e.g., Jump, Const, Integer, Load, Store, ctsr, cfsr or SIMD). The meanings of the various opcode names are summarized in TABLE 1 below.

The rightmost field, function, is always four bits in these examples. Together the opcode field and function field specify the particular operation to be performed by the compound operation. The opcode and function fields have fixed sizes and locations to facilitate decoding the operation and sending it to the correct execution unit. The remaining operation fields vary based on the opcode and function. The meanings of the operation fields are summarized in TABLE 2 below.

It is to be appreciated that the particular details of the compound operations as set forth in TABLE 1 and TABLE 2 are merely examples, and should not be construed as limiting the scope of the invention in any way.

Figure 3:
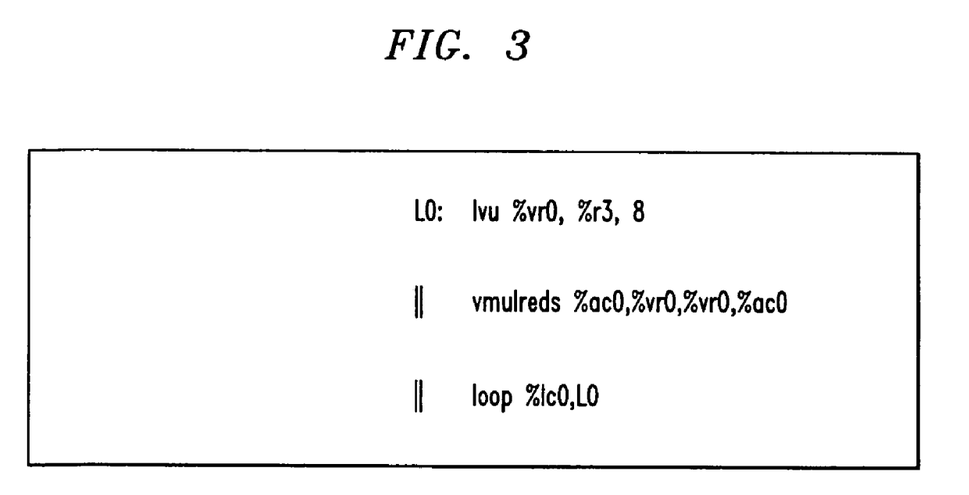
FIG. 3 shows an example of assembly language code for a single 64-bit compound instruction having the format shown in FIG. 2A.

FIG. 3 shows an example of assembly language code for a single 64-bit compound instruction with three compound operations. The notation ∥ between operations indicates that all three compound operations execute in parallel. This instruction implements the inner loop of a vector sum-of-squares computation. The first compound operation, lvu, loads a vector register vr0 with four 16-bit vector elements and updates an address pointer r3 to the next element. The vmulreds operation reads four fixed-point (fractional) 16-bit vector elements from vr0, multiplies each element by itself, saturates each product, adds all four saturated products plus an accumulator register, ac0, with saturation after each addition, and stores the result back in ac0. The loop operation decrements the loop count register lc0, compares it to zero, and branches to address L0 if the result is not zero.

TABLE 1

Meanings of Opcode Names

| Opcode Name | Opcode Meaning |
| --- | --- |
| Jump | Operation type is jump. Jump operations include unconditional jumps, conditional jumps, subroutine calls, loops, and return from interrupt. |
| Const | Operation type is constant (extended immediate). This operation type allows two 21-bit compound operation fields to be used together to specify an instruction with a longer immediate value. The Const opcode is also used to specify no operation (NOP). |
| Integer | Operation type is integer. Integer operations include integer arithmetic, logical, and data manipulation operations. |
| Load | Operation type is a load. Load operations are used to load data from memory to the processor. |
| Store | Operation type is a store. Store operations are used to store data from the processor to memory. |
| Ctsr | Operation type is copy to special register. Ctsr operations allow data to be copied from an integer register to a special register. |
| Cfsr | Operation type is copy from special register. Cfsr operations allow data to be copied from special register to an integer register. |
| SIMD | Operation type is Single Instruction Multiple Data (SIMD). SIMD operations perform arithmetic, logical, and data manipulation operations on multiple vector elements in parallel. The vector elements may be 8, 16 or 40-bit fixed point numbers, or 32-bit floating point numbers. In practice, different opcodes may be used to specify the different types of vector elements. |

TABLE 1-continued

Meanings of Opcode Names

| Opcode Name | Opcode Meaning |
| --- | --- |

TABLE 2

Meanings of Operation Field Names

| Operation Field Name | Operation Field Meaning |
| --- | --- |
| Function | Function to be performed by the compound operation for a given opcode |
| Imm12 | 12-bit immediate (constant) operand |
| Imm8 | 8-bit immediate (constant) operand |
| Imm4 | 4-bit immediate (constant) operand. |
| Cfa | 3-bit condition flag source register specifier |
| Cft | 3-bit condition flag target register specifier |
| C | 1-bit complement condition specifier |
| ra, rb | 4-bit general purpose source register specifiers |
| Rt | 4-bit general purpose target register specifier |
| srt1, srt2 | 4-bit special purpose register specifiers |
| va, vb, vs | 3-bit vector source register specifiers |
| Vt | 3-bit vector target register specifier |
| wa, wb | 3-bit wide source register specifiers |
| Wt | 3-bit wide target register specifier |
| / | Bits are not specified |

Compared to conventional instruction and operation formats, the formats of the illustrative embodiment have several advantages.

First, they allow powerful compound instructions, composed of up to three compound operations, to be specified using only 64 bits. This helps to improve processor code size, power consumption and performance.

Second, the compound instruction format is flexible, since it allows a wide variety of compound operations to be specified.

Third, by allowing the compound instructions to be executed either sequentially or in parallel, the instruction format allows code to be optimized for both size and performance.

Fourth, restrictions may be placed on the type of operation allowed in each operation field to reduce the design complexity of the processor. In the example given above, a particular implementation may restrict Operation 1 to be only Jump or Const operations, Operation 2 to be only Integer or Load/Store operations, and Operation 3 to be only SIMD operations. Numerous other types of restrictions may be applied.

Fifth, certain compound operations that require more than 21 bits may use, for example, two operation fields, where the second operations field provides an extended immediate value.

The present invention may be implemented in a multithreaded processor. A more particular example of a multithreaded processor in which the invention may be implemented is described in U.S. patent application Ser. No. 10/269,372, filed Oct. 11, 2002 and entitled "Multithreaded Processor With Efficient Processing For Convergence Device Applications," which is commonly assigned herewith and incorporated by reference herein. This multithreaded processor may be configured to execute RISC-based control code, DSP code, Java code and network processing code. It includes a single instruction multiple data (SIMD) vector processing unit, a reduction unit, and long instruction word (LIW) compounded instruction execution. Examples of threading and pipelining techniques suitable for use with this exemplary multithreaded processor are described in U.S. patent application Ser. No. 10/269,245, filed Oct. 11, 2002 and entitled "Method and Apparatus for Token Triggered Multithreading," now issued as U.S. Pat. No. 6,842,848, which is commonly assigned herewith and incorporated by reference herein.

Of course, the invention can be implemented in other multithreaded processors, or more generally other types of digital data processors.

Another exemplary multithreaded processor that may make use of the compound instruction and operation formats of the present invention is described in U.S. patent application Ser. No. 10/841,261, filed May 7, 2004 and entitled "Processor Reduction Unit for Accumulation of Multiple Operands With or Without Saturation," which is commonly assigned herewith and incorporated by reference herein.

Figure 4:
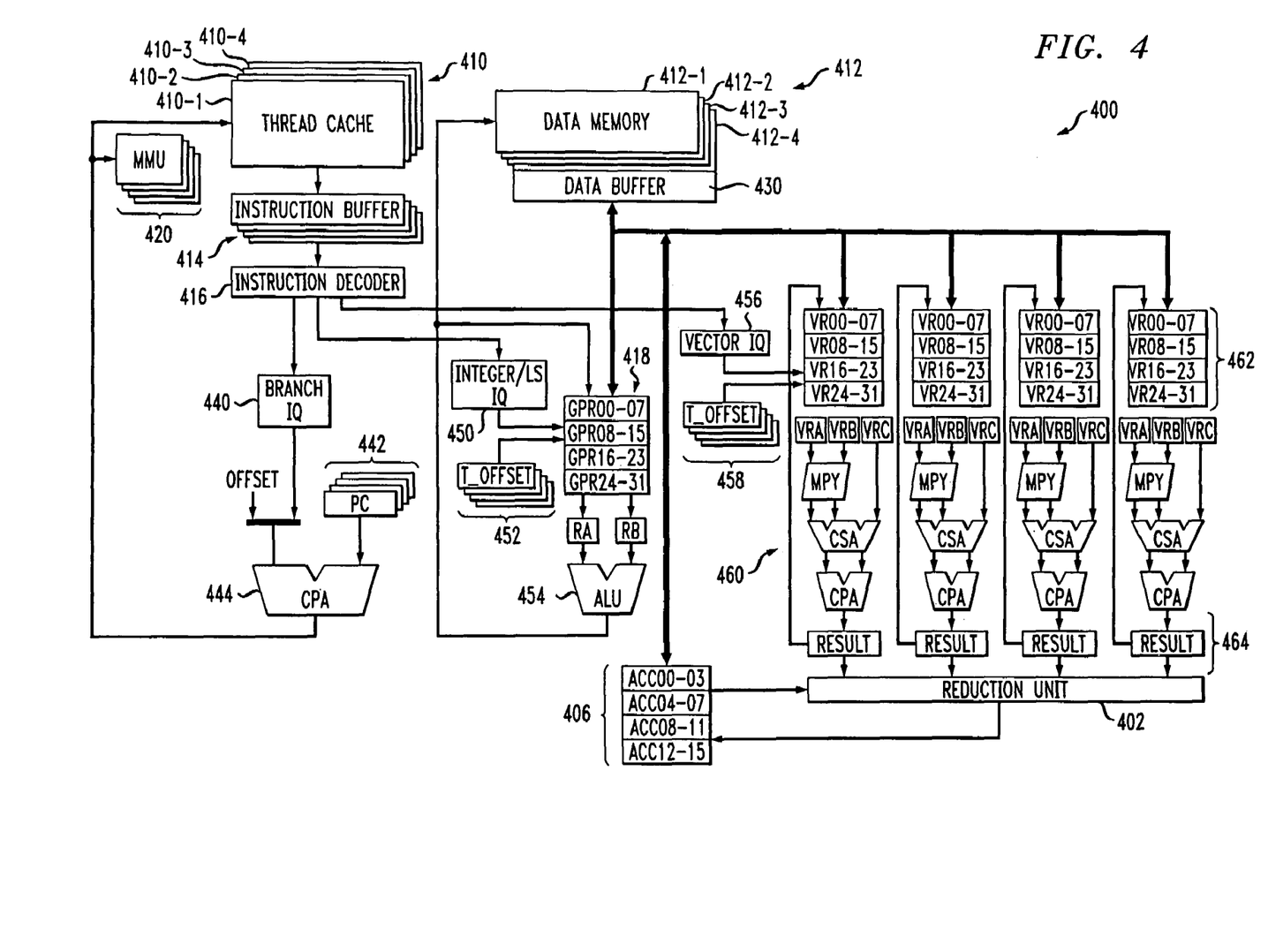
FIG. 4 shows a more detailed view of an exemplary multithreaded processor which may be used to process instructions configured using the formats of FIGS. 2A and 2B.

FIG. 4 shows an example of a multithreaded processor 400 incorporating a reduction unit 402 and an accumulator register file 406. The processor 400 is generally similar to that described in U.S. patent application Ser. No. 10/269,372, but incorporates reduction unit 402 and accumulator register file 406 configured as described in the above-cited U.S. patent application Ser. No. 10/841,261.

The multithreaded processor 400 includes, among other elements, a multithreaded cache memory 410, a multithreaded data memory 412, an instruction buffer 414, an instruction decoder 416, a register file 418, and a memory management unit (MMU) 420. The multithreaded cache 410 includes a plurality of thread caches 410-1, 410-2, ... 410-N, where N generally denotes the number of threads supported by the multithreaded processor 400, and in this particular example is given by N=4. Of course, other values of N may be used, as will be readily apparent to those skilled in the art.

Each thread thus has a corresponding thread cache associated therewith in the multithreaded cache 410. Similarly, the data memory 412 includes N distinct data memory instances, denoted data memories 412-1, 412-2, ... 412-N as shown.

The multithreaded cache 410 interfaces with a main memory (not shown) external to the processor 400 via the MMU 420. The MMU 420, like the cache 410, includes a separate instance for the each of the N threads supported by the processor. The MMU 420 ensures that the appropriate instructions from main memory are loaded into the multithreaded cache 410.

The data memory 412 is also typically directly connected to the above-noted external main memory, although this connection is also not explicitly shown in the figure. Also associated with the data memory 412 is a data buffer 430.

In general, the multithreaded cache 410 is used to store instructions to be executed by the multithreaded processor 400, while the data memory 412 stores data that is operated on by the instructions. Instructions are fetched from the multithreaded cache 410 by the instruction decoder 416 and decoded. Depending upon the instruction type, the instruction decoder 416 may forward a given instruction or associated information to various other units within the processor, as will be described below.

The processor 400 includes a branch instruction queue (IQ) 440 and program counter (PC) registers 442. The program counter registers 442 include one instance for each of the threads. The branch instruction queue 440 receives instructions from the instruction decoder 416, and in conjunction with the program counter registers 442 provides input to an adder block 444, which illustratively comprises a carry-propagate adder (CPA). Elements 440, 442 and 444 collectively comprise a branch unit of the processor 400. Although not shown in the figure, auxiliary registers may also be included in the processor 400.

The register file 418 provides temporary storage of integer results. Instructions forwarded from the instruction decoder 416 to an integer instruction queue (IQ) 450 are decoded and the proper hardware thread unit is selected through the use of an offset unit 452 which is shown as including a separate instance for each of the threads. The offset unit 452 inserts explicit bits into register file addresses so that independent thread data is not corrupted. For a given thread, these explicit bits may comprise, e.g., a corresponding thread identifier.

As shown in the figure, the register file 418 is coupled to input registers RA and RB, the outputs of which are coupled to an arithmetic logic unit (ALU) block 454, which may comprise an adder. The input registers RA and RB are used in implementing instruction pipelining. The output of the ALU block 454 is coupled to the data memory 412.

The register file 418, integer instruction queue 450, offset unit 452, elements RA and RB, and ALU block 454 collectively comprise an exemplary integer unit.

Instruction types executable in the processor 400 include Branch, Load, Store, Integer and Vector/SIMD instruction types. If a given instruction does not specify a Branch, Load, Store or Integer operation, it is a Vector/SIMD instruction. Other instruction types can also or alternatively be used. The Integer and Vector/SIMD instruction types are examples of what are more generally referred to herein as integer and vector instruction types, respectively.

A vector IQ 456 receives Vector/SIMD instructions forwarded from the instruction decoder 416. A corresponding offset unit 458, shown as including a separate instance for each of the threads, serves to insert the appropriate bits to ensure that independent thread data is not corrupted.

A vector unit 460 of the processor 400 is separated into N distinct parallel portions, and includes a vector file 462 which is similarly divided. The vector file 462 includes thirty-two registers, denoted VR00 through VR31. The vector file 462 serves substantially the same purpose as the register file 418 except that the former operates on Vector/SIMD instruction types.

The vector unit 460 illustratively comprises the vector instruction queue 456, the offset unit 458, the vector file 462, and the arithmetic and storage elements associated therewith.

The operation of the vector unit 460 is as follows. A Vector/SIMD block encoded either as a fractional or integer data type is read from the vector file 462 and is stored into architecturally visible registers VRA, VRB, VRC. From there, the flow proceeds through multipliers (MPY) that perform parallel concurrent multiplication of the Vector/SIMD data. Adder units comprising carry-skip adders (CSAs) and CPAs may perform additional arithmetic operations. For example, one or more of the CSAs may be used to add in an accumulator value from a vector register file, and one or more of the CPAs may be used to perform a final addition for completion of a multiplication operation, as will be appreciated by those skilled in the art. Computation results are stored in Result registers 464, and are provided as input operands to the reduction unit 402. The reduction unit 402 sums the input operands in such a way that the summation result produced is the same as that which would be obtained if each operation were executed in series. The reduced sum is stored in the accumulator register file 406 for further processing.

When performing vector dot products, the MPY blocks perform four multiplies in parallel, the CSA and CPA units perform additional operations or simply pass along the multiplication results for storage in the Result registers 464, and the reduction unit 402 sums the multiplication results, along with an accumulator value stored in the accumulator register file 406. The result generated by the reduction unit is then stored in the accumulator register file for use in the next iteration, in the manner previously described.

The accumulator register file 406 in this example includes a total of sixteen accumulator registers denoted ACC00 through ACC15.

The multithreaded processor 400 may make use of techniques for thread-based access to register files, as described in U.S. patent application Ser. No. 10/269,373, filed Oct. 11, 2002 and entitled "Method and Apparatus for Register File Port Reduction in a Multithreaded Processor," which is commonly assigned herewith and incorporated by reference herein.

The multithreaded processor 400 is well suited for use in performing vector dot products and other types of parallel vector multiply and reduce operations, as described in the above-cited U.S. patent application Ser. No. 10/841,261.

It should again be noted that the particular processor configurations shown in FIGS. 1 and 4 are presented by way of illustrative example only, and additional or alternative elements not explicitly shown may be included, as will be apparent to those skilled in the art.

It should also be emphasized that the present invention does not require the particular compound instruction and operation formats shown in FIGS. 2A, 2B and 3. The invention can be implemented using a wide variety of other types of instructions and operations, with other instruction and operation formats.

Thus, the above-described embodiments of the invention are intended to be illustrative only, and numerous alternative embodiments within the scope of the appended claims will be apparent to those skilled in the art.

What is claimed is:

1. A multi-threaded processor comprising:
   a memory;
   an instruction decoder coupled to the memory for decoding instructions retrieved therefrom;
   an integer unit coupled to the instruction decoder for processing integer type instructions received from the instruction decoder;
   a vector unit coupled to the instruction decoder for processing vector type instructions received from the instruction decoder;
   an accumulator unit associated with the vector unit for storing a first accumulator value; and
   a reduction unit associated with the vector unit and the accumulator unit and configured to receive parallel data elements processed in the vector unit and to receive the first accumulator value from the accumulator unit, the reduction unit being operable to sum the parallel data elements and the first accumulator value, wherein the sum of the parallel data elements produces the same result as would be obtained if the parallel data elements were summed in series, and to generate a second accumulator value for delivery to the accumulator unit,
   wherein one or more of the instructions are in a compound instruction format in which a single instruction comprises of multiple operation fields.

2. The multi-threaded processor of claim 1, wherein one or more of the operation fields each comprising at least an operation code field and a function field, the operation code field and the function field together specifying a particular operation to be performed by one of the integer unit and the vector unit.

3. The multi-threaded processor of claim 2, wherein the operation code and function fields have fixed size and locations within the operation fields.

4. The multi-threaded processor of claim 2, wherein the operation codes comprise jump, constant, integer, load, store, copy to special register, copy from special register, and single instruction multiple data.

5. The multi-threaded processor of claim 1, wherein a given one of the instructions in the compound instruction format comprises at least three operation fields.

6. The multi-threaded processor of claim 1 wherein a given one of the instructions in the compound instruction format comprises, in addition to the multiple operation fields, at least one additional field comprising dependency field.

7. The multi-threaded processor of claim 6 wherein the dependency field comprises a single bit field which indicates if compound operations designated in the multiple operation fields should be executed sequentially or in parallel.

8. The multi-threaded processor of claim 1 wherein a given one of the instructions in the compound instruction format comprises a 64-bit instruction having three 21-bit operation fields and a one-bit dependency field.

9. The multi-threaded processor of claim 1 wherein a given one of the instructions in the compound instruction format comprises a compound operation that is specified by two or more multiple operation fields of the instruction.

10. The multi-threaded processor of claim 1 wherein one or more of the operation fields of a given one of the instructions in the compound instruction format is restricted in terms of the particular operations which can be designated thereby.

11. The multi-threaded processor of claim 1 wherein one or more of the operation fields of a given one of the instructions in the compound instruction format is restricted to single instruction multiple data operations.

12. The multi-threaded processor of claim 1 wherein the processor comprises an integrated circuit.

* * * * *